United States Patent [19]

Eden et al.

[11] Patent Number: 4,812,445

[45] Date of Patent: Mar. 14, 1989

[54] STARCH BASED ENCAPSULATION PROCESS

[75] Inventors: James Eden, East Millstone; Ralph Trksak, Manville, both of N.J.; Robert Williams, Homosassa, Fla.

[73] Assignee: National Starch and Chemical Corporation, Bridgewater, N.J.

[21] Appl. No.: 41,563

[22] Filed: Apr. 23, 1987

Related U.S. Application Data

[63] Continuation-in-part of Ser. No. 11,952, Feb. 6, 1987, abandoned.

[51] Int. Cl.$^4$ .................. A23L 1/22; A23L 1/226; A61K 9/26; A01N 25/28
[52] U.S. Cl. .................. 514/60; 514/778; 514/965; 424/484; 424/485; 424/488; 424/499; 264/217; 264/218
[58] Field of Search ............ 514/60, 778, 965; 424/484, 485, 488, 499; 264/217, 218

[56] References Cited

U.S. PATENT DOCUMENTS

| | | | |
|---|---|---|---|
| 2,369,847 | 12/1941 | Olsen et al. | 426/534 |
| 2,809,895 | 7/1955 | Swisher | 426/651 |
| 2,902,336 | 9/1959 | Hiemstra | 264/186 |
| 3,030,667 | 4/1962 | Kunz | 264/218 |
| 3,041,180 | 10/1957 | Swisher | 426/96 |
| 3,116,351 | 12/1963 | Wohlrabe | 264/186 |
| 3,336,429 | 8/1967 | Carevic | 264/186 |
| 3,499,962 | 8/1967 | Wurzburg et al. | 424/489 |
| 3,514,298 | 3/1968 | Nozmick et al. | 426/658 |
| 3,786,123 | 1/1971 | Katzen | 264/53 |
| 3,922,365 | 11/1975 | Galluzzi et al. | 425/96 |
| 3,971,852 | 7/1976 | Bremmer et al. | 426/103 |
| 4,139,699 | 2/1979 | Hernandez et al. | 536/109 |
| 4,230,687 | 10/1980 | Sair et al. | 424/485 |
| 4,238,475 | 12/1980 | Witzel et al. | 424/48 |
| 4,242,364 | 12/1980 | Buddemeyer et al. | 426/98 |
| 4,243,480 | 1/1981 | Hernandez | 162/141 |
| 4,276,312 | 6/1981 | Merritt | 426/96 |
| 4,277,364 | 7/1981 | Shasha et al. | 71/94 |
| 4,331,689 | 5/1982 | Shemwell | 426/98 |
| 4,344,857 | 8/1982 | Shasha et al. | 71/94 |
| 4,382,813 | 5/1983 | Shasha | 71/88 |
| 4,439,488 | 3/1984 | Trimnell | 428/402.24 |
| 4,515,769 | 5/1985 | Merritt et al. | 424/49 |
| 4,657,582 | 4/1987 | Huber | 71/121 |
| 4,702,918 | 10/1987 | Ushimaru et al. | 514/60 |

FOREIGN PATENT DOCUMENTS 0145846 8/1984 European Pat. Off.
1072795 6/1967 United Kingdom.

*Primary Examiner*—Ronald W. Griffin
*Attorney, Agent, or Firm*—Ellen T. Dec; Edwin M. Szala

[57] ABSTRACT

Virtually any material may be encapsulated in a starch matrix by combining the material with a high temperature-stabilized dispersion of starch, optionally in the presence of salt. The temperature-stabilized starch dispersion acts as a protective colloid, encasing the material to be encapsulated. Upon subsequent rapid cooling of this mixture on a chilled surface the starch polymer chains collapse upon themselves, forming a firm sheet or the like and encapsulating the core material. The sheet can then be cut, chopped or sliced in the wet state, then dried and ground to yield particles.

19 Claims, No Drawings

STARCH BASED ENCAPSULATION PROCESS

BACKGROUND OF THE INVENTION

This is a continuation-in-part of copending application Ser. No. 011,952 filed Feb. 6, 1987, now abandoned.

The present invention is directed to a method for the encapsulation of materials in a matrix composed of unmodified or modified starch, starch flour or cereal under conditions that reduce or eliminate the decomposition and/or loss of the material being encapsulated.

Many methods have been employed in the prior art to encapsulate a variety of materials. In general, the specific method employed as well as the encapsulating agent utilized has been dependent on the type of material being encapsulated. Thus the volatile or non-volatile nature of the material as well as its water or oil solubility have been the principal factors controlling the method of encapsulation and the encapsulating materials chosen.

SUMMARY OF THE INVENTION

We have now found a method for encapsulating virtually any material regardless of volatility or solubility using starch as the encapsulating agent.

In accordance with the present invention, the materials to be encapsulated are combined with a high temperature-stabilized dispersion of starch, optionally containing salt. The temperature-stabilized starch dispersion acts as a protective colloid, encasing the material to be encapsulated. Upon subsequent rapid cooling of this mixture on a chilled rotating drum, the starch polymer chains collapse upon themselves, forming a firm sheet and encapsulating the core material. The sheet can then be cut, chopped or sliced in the wet state, then dried and ground to yield particles. in the resultant product, the material being encapsulated is evenly distributed throughout the starch matrix.

Thus, the encapsulation process of the present invention comprises the following steps:

(1) slurrying the starch in water, optionally in the presence of salt;

(2) thoroughly dispersing the starch in the slurry by injecting steam at a pressure of at least 110 psi into the slurry to raise its temperature to 120° to 180° C. at a pressure of 55–120 psi or above;

(3) adding to the dispersion the material to be encapsulated and effecting intimate mixing of the latter therein;

(4) spreading the resultant mixture on a chilled surface such as a chilled revolvig drum or a continuous belt;

(5) recovering the encapsulated material in sheet form; and (6) cutting or grinding and drying the resultant matrix of starch and encapsulated material.

DETAILED DESCRIPTION OF THE PREFERRED EMBODIMENTS

A wide range of materials may be encapsulated using the process disclosed herein. The only limitations with respect to the core material to be encapsulated are that it not react with water or salt, if present, or irreversibly with starch, and that it be stable for short periods at the elevated temperatures employed. Thus, it is possible to encapsulate water soluble materials as well as some low boiling materials which have adequate stability for the very short time for which the materials are exposed to the elevated temperatures of the starch dispersion. Representative materials include flavors and seasonings such as flavoring oils; natural and artificial sweeteners such as aspartame; pigments; metallic powders; latices; oils; plasticizers; herbicides; insecticides; fumgicides; nematicides; bacteriocides; rodenticides; molluscicides; acaricides; larvacides; fumigants; animal repellants; insect repellants; plant growth regulators; fertilizers; pheromones; odor producing compositions; catalysts; adhesives; pressure sensitive color formers; electrostatographic toners; pressure rupturable lubricants; antifoulants; phase change materials; fire extinguishers; corrosion inhibitors; defoamers; sizing agents; thickeners; unsaturated fats and acidulants, sub-cutaneous medications, etc. Depending upon the type of core material employed, from as little as 0.1% to as much as 80% by weight core material (based on solids of starch plus core material) may be encapsulated in the starch matrix.

The benefits of the present invention are particularly exemplified in the encapsulation of dimethyl anthranilate, a non-toxic food flavoring that is repellant to birds and has a high volatility at ambient temperatures. Heretofore, this high volatility has prevented its use as a bird repellant in animal foods and natural environments. Some methods have been proposed for spray-drying the dimethyl anthranilate with dextrin or other modified starches. Such spray-dried, encapsulated dimethyl anthanilate has two major drawbacks; first, it is water soluble, making it unsuitable for application in natural environments with the potential of rainfall and high humidities would cause the untimely release of the bird repellant.

In contrast, when dimethyl anthranilate is encapsulated using the methods described herein, it can be encapsulated in a water insoluble starch matrix which will provide a controlled rate of release of the bird repellent over a period of about 30/40 days at 20° C./50% relative humidity or at 40° C./90% relative humidity.

The process of the invention is not limited to any specific starch encapsulating materials. Corn starch, rice starch, potato starch, tapioca starch, wheat starch, amylose or amylopectin fractions may be employed. The starch base may be used in modified or unmodified form. The choice of the starch to be used is dependent in large part on the end use of the encapsulated material particularly the mechanism and desired rate of release, if any, of the material from the encapsulating matrix.

In addition to the use of starch as the encapsulating material, water soluble hydrocolloids such as polyvinyl alcohol, carboxymethylcellulose, hydroxyethylcellulose, polyacrylic acid and polyvinyl pyrroliddone may replace up to 50% of the starch component.

Although not theoretically required to effect encapsulation according to the present invention, the addition of salt to the starch slurry results in more efficient formation of the sheet on the chilled surface, especially in the case of starches containing relatively low levels of amylose. As an example, the use of high amylose starches (i.e. those containing more than approximately 50% amylose) in the absense of salt allows the formation of a firm (set) sheet in 2 or 3 seconds, permitting the sheet to be doctored off the chilled surface after this brief period. In contrast, the use of corn starch without added salt requires 10 to 15 seconds for adequate set; hence, the speed of rotatio of the drum or movement of any other chilled surface must be regulated accordingly. Other starches which require even longer set times would therefore not be useful on a practical basis without the addition of the salt. Suitable salts for this use include ammonium sulfate, ammonium monobasic or dibasic phosphate, magnesium sulfate, sodium sulfate and mixtures thereof.

While there is no requirement regarding the selection of any of the above components used in the process, once they are determined the ratios of the components are interrelated. Thus, the need for as well as the ratio of salt, starch and water in the slurry are dependent upon the starch selected. As discussed previously, those starches containing high levels of amylose require little or no salt to effect efficient setting on the chilled surface while amylopectin based starched or dextrins may require saturated or super-saturated levels at the exit temperature. Similarly, the level of amylose in the starch affects the choice and concentraion of the salt required for efficient precipitation, with the higher amylose containing starches capable of forming a firm sheet with any concentration of any of the salts mentioned above, while the starches with lower levels of amylose require higher levels of the preferred salts such as ammonium sulfate and magnesium sulfate for efficient precipitation rates. The amount of starch usually varies from about 20 to 40% by total weight of the slurry (starch, salt if present and water). The amount of salt employed should be kept as low as possible, generally in the range of 10 to 20% by total weight of the slurry (starch, salt if present, and water) since some of the salt employed will remain in the final starch matrix. In all cases, the levels of the components should be such that the starch/salt/water ratio does not cause retrogradation prior to setting on the chilled surface.

In general, the process of the invention involves the following steps, all of which may be conducted in a continuous manner.

First, a slurry of starch (and any hydrocolloid or salt desired), is formed. If ammonium sulfate or ammonium phosphate is used, it may be necessary to add an acidic material to lower the pH to 8 or below. No pH adjustment is needed if magnesium sulfate is the salt used as it is effective under both acidic and basic conditions.

The temperature of the slurry is then raised via steam injection to a temperature high enough to thoroughly dispersed and cook the starch. This temperature is generally in the range of 120° to 180° C. at a pressure of 55 to 120 psi or above, preferably 130° to 165° C.

In accordance with a preferred embodiment, the pressurized starch dispersion is piped to a vertical flash chamber sized and constructed so that the liquid readily flows to the bottom and the gas (i.e. excess steam and entrained air) cleanly separates at the top. The gas is then vented through an adjustable relief valve, the setting of which controls the pressure in the flash chamber and consequently the temperature of the starch dispersion. While not essential, the latter step provides a useful process control by reducing and controlling the cooked starch temperature to a preferred range of about 105° to 120° C. for the remainder of the process. It also degasses the starch dispersion so that foaming at the drum or on any other chilled surface and dilution is reduced and accurate metering of the starch is facilitated.

After the starch has been thoroughly cooked and preferably degassed, a metered flow of the core material (i.e. the material to be encapsulated) is added. While the core material could have been added to the starch dispersion initially or at some earlier stage in the processing, its addition at this point where the temperature of the starch dispersion is lower than that required to cook the starch and at a point nerer to the chilled surface reduces the exposure of the core material to both the maximum temperature and time at that elevated temperature allowing encapsulation of heat sensitive or volatile materials which could not have been otherwise encapsulated. Further, since the oxygen levels have been reduced by the extraction of vapor phase steam before injection of the core material, there is little risk of oxidation of easily oxidized core materials. The starch dispersion and core material are intimately mixed by piping through a static mixer. In the case of oily core materials, a turbine emulsifier or similar means may be required to evenly distribute fine oil droplets throughout the starch cook.

The resulting mixture is then spread on a chilled moving surface maintained at a temperature of below about 15° C. Here, the starch rapidly retrogrades to a firm sheet, trapping all the other components with little or no synerisis (weeping) of water or salt solution. Due to the rapid set of the high solids starch used in this process, time in contact with the chilled surface need only be on the order of seconds. This allows use, for example, of small diameter drums (approx. 2 ft.) or short runs of chilled belt and permits high rates of production. The sheet can then be cut, ground or extruded with minimum loss of the encapsulated core material and then dried. If salt has been employed, it may be desired to wash the salt from the resultant ground encapsulated material.

The release characteristics, i.e., the ability of the encapsulated core material to be released from the starch matrix, can be varied by the practitioner to permit fairly rapid release by using an undried, low amylose, high moisture particulate mass to a very slow release rate using a dried, high-amylose starch film. Similarly, the temperature at which the release will be effected can be varied from as low as about room temperature using a dextrin based starch to over 90° C. using a high amylose starch base.

Since the resultant dried matrix can be resistant to acid and alkali, (depending on the starch used) further modifications can be made. Thus, it is possible to react the matrix with crosslinking agents or cationic or anionic groups or it can be oxidized or chemically modified in other ways without affecting the core material encapsulated therein.

In the following examaples, which are for illustrative purposes only, all parts are by weight and all temperatures in degrees Celsius unless otherwise noted.

EXAMPLE 1

Encapsulation of a Volatile Solvent with Controlled Release

A slurry of the following composition was made:

| high amylose (70%) corn starch | 38 parts |
| water | 62 parts |

This slurry was cooked at 175° C. and 35 percent solids, and then piped to a vertical flash chamber. On entering the flash chamber the steam pressure used during cooking was reduced to less than 10 psig and consequently the temperature reduced to 105°–110° C.

Steam vapor was separated from the starch by gravity and vented through a spring loaded relief valve. The de-gassed starch was metered into a static mixer. Simultaneously, liquid heptane (boiling point 100° C.) was metered into the starch upstream of the static mixer.

After passing through the static mixer the blended starch/solvent mix was passed through a turbine pump. The average size of the heptane droplets was reduced by the shear action of the pump to a range of approximately 1–5 microns.

The temperature of the heptane and surface heat loss from the piping was controlled so that the temperature of the starch/heptane emulsion was 78°–82° C. on exiting the turbine pump. At this temperature only a small percentage of the heptane was present as vapor and the vast majority of the vapor was retained, entrained in the viscous liquid starch cook. Transit time between heptane point of addition and exiting the turbine pump was only 3–4 seconds due to the short lengths of pipe involved.

After exiting the turbine pump the starch emulsion was rapidly piped to an applicator mounted on a rotating chilled metal drum. This applicator consisted of a longitudinal half-section of pipe mounted transversely across the drum surface with the open side against the drum and the leading edge and sides sealed against the drum. The trailing edge had an adjustable blade at an obtuse angle to the drum's surface. As the starch/solvent emulsion was pumped into the applicator it was spread by the blade into a thick film with the thickness controlled by the blade clearance; the width by drum speed and rate of starch feed. The starch emulsion pool volume inside the applicator was adjusted so that dwell time was less than a second. Since the starch rapidly cooled in contact with the chilled drum after the film was spread, this dwell time was the sole exposure of core material to heat, at atmospheric pressure, using this process. Upstream, the starch/core material emulsion was under pressure in piping. Downstream of the applicator the core material was contained in a cold retrograded starch matrix. This short dwell time has obvious advantages when encapsulating heat sensitive, oxygen sensitive or volatile core materials.

A doctor blade was mounted on the drum to remove the chilled and set starch/core material film. This rapidly set film, after cooling by contact with the chilled drum, was firm, non-tacky, mechanically stable, and at or near room temperature. The injected core material was uniformly dispersed throughout the interior of the film with no free liquid water present; all water in the de-gassed cook, from either slurry makeup or injected as steam, was retained in the firm retrograded starch film.

The material was manually diced into one quarter inch cubes, then dried in a lab-scale forced air drier (Moisture Teller, Harry W. Dietert Co.) for six minutes at 60° C. The dried product consisted of hard opaque-white chips with a faint odor of heptane.

This dried product was analyzed by gas chromatography and found to contain (8%) heptane on dry starch. The following extraction procedure was used to prepare the GC samples: 2 g of air dry starch/heptane matrix was dissolved in 19 g dimethylsulfoxide (DMSO) in a sealed vial using gentle heat. The DMSO solution of starch was cooled and 10 g of methylene chloride (containing 0.1% chloroform for use as an internal GC standard) was added to precipitate the starch. Next, 2 g water was added to destabilize the DMSO/methylene chloride solution. On addition of water two phases separated, the lower was methylene chloride was heptane, the upper was DMSO and water. Control extractions, using dried cooked starch with added heptane showed complete recovery of the heptane in the methylene chloride phase.

An aliquot of the lower phase was analysed using a Hewlett Packard Model 5890 gas chromatograph to determine heptane concentration. A HP-1 capillary column 10 meters by 0.53 mm with methyl silicone gum stationary phase was used. Sample size was 1 microliter. Injector sample split was 98:2. Temperature programming was: 50 C., 2 min; 25 degrees per min rise to 300 C.; hold at 300 C., 5 min. Dried heptane containing starch chips were exposed at room temperature in a single thickness layer. Samples were taken daily and analysed by the above procedure. Time for 50% loss of this unencapsulated heptane in the form of control batches of 10% heptane adsorbed on granular starch averaged 2.9 minutes while time for 50% loss of the encapsulated heptane was approximately 12 days.

Completely decoupled carbon-13 Nuclear Magnetic Resonance analysis showed that the heptane was present in the dried starch matrix, either totally or in the great majority, as discrete droplets of liquid, several microns or less in diameter.

EXAMPLE 2

Encapsulation of Water Soluble Dye

A 30 percent slurry of corn starch (70% amylose) with 10% Napthol B green dye (on starch weight) was jet cooked at 150° C., the pressure reduced to less than 10 psig and the steam vapor separated from the liquid starch. The degassed starch was metered onto a chilled rotating steel drum through an applicator box. As the starch was spread on the drum's surface its temperature dropped in less than two seconds from approximately 110° C. to less than 38° C. As a result of the temperature drop the starch set to a continuous sheet of firm gel, without any free liquid. The resulting dark green sheet was cut to pieces 10–20 mm long, 3 mm wide and approx. 0.5 mm thick. They were oven dried to approximately 12% moisture. Rate of release in water was determined by adding a weighed portion of dried starch containing the entraped napthol green to a known volume of water. The reduction in transmittance at 520 nm due to release of dye was measured with a Brinkmann C-800 colorimeter; a 2 cm probe was used. The unencapsulated Naphthol B green dye dissolved immediately in water while the encapsulated dye released slowly, over time, in a controllable manner.

EXAMPLE 3

Encapsulation of Food Flavoring Oil with Reduction of Handling Hazard

Oil of Capsicum (the extracted active agent in hot peppers) is a required ingredient in many highly spiced foods; however, it can be a handling problem since the concentrated strengths used for flavoring by the food industry can cause severe skin and mucous membrane irritation. An additional concern with Capsicum Oil is the retention of uniform strength during storage. Encapsulation in starch can reduce these problems by containing the oil in a free flowing granular powder with little free surface oil; volatiles are retained (and oxidation should be reduced).

These benefits were demonstrated by jet cooking high amylose (70%) corn starch at 30% solids, mixing a 50 gram portion of the hot cook in an Epenbach mixer (Ace Scientific supply), adding 4.5 grams of capsicum oil (500,000 heat units/gram, commercial sample) with 0.045 g sodium stearoyl lactylate to form an emulsion, and casting a film from the emulsion in a chilled aluminum pan simulating a chilled casting surface. The emulsion rapidly set to a firm flexible dark red sheet with a faint hot pepper odor. This sheet was cut into one eighth inch cubes and Dietert dried for ten minutes at 48° C. The resulting products were hard free-flowing dark red cubes with only a very faint pepper odor. The cubes were almost completely free of surface oil unless crushed and could be handled safely.

To further evaluate the encapsulation procedure, the dried product was solvent extracted, using a soxhlet extraction apparatus, with four sequential solutions: acetone, 4:1 acetone/water, 5:1 methanol/water, and acetone. The solvents were combined, vacuum stripped, and the extracted capsicum oil weighed. The extractable oil was 69.6% of the oil added to the cooked starch. Recovery was not complete, as there was residual color and odor in the extracted starch matrix.

EXAMPLE 4

Encapsulation of a Solid

A starch slurry was made of the following composition:

| | |
|---|---|
| High amylose (70%) corn starch | 32.6 parts |
| Calcium Carbonate (Hydrocarb 65, Omya) | 16.3 parts |
| Water | 51.1 parts |

The slurry was jet cooked and applied to a chilled rotating drum as in Example 1. The product was a white film continuous sheet. It was pelletized by being forced through a 20 mesh screen and Dietert dried. The dried product consisted of white prills approximately 1 mm diameter by 2-3 mm long.

The encapsulating starch provides the core material with a degree of protection against attack by acid solutions and may be used to provide controlled release. This was demonstrated by placing the dried material described above in pH 4.0 hydrochloric acid solution at 25% solids on total, and measuring the dissolved calcium in solution over time. The pH was controlled at 4.0±0.1 by an automatic pH controller (Analytical Measurements Inc.) which metered additional 0.25N hydrochloric acid into the slurry via a Masterflex peristaltic pump. Samples of the slurry were taken, immediately filtered, and dissolved calcium determined by titration with ethylenediamine tetraacetic acid sodium salt (EDTA) (Method 309B, 14th Ed. Std. Methods for Examination of Water and Waste Water, Am. Public Health Assoc.).

A control blend of calcium carbonate and raw high amylose corn starch was exposed at pH 4.0 in an identical manner. Eighty percent (80%) of the unencapsulated calcium carbonate dissolved in less than one minute; however the encapsulated calcium carbonate required approximately 17.4 hours to release the same amount.

EXAMPLE 5

Encapsulation of a Volatile Oil Using Salt

An industrial masking scent (NJ 1838, PPF, Inc.) was encapsulated using a variation of the method described in Example 1.

| Two suspensions were made: | |
|---|---|
| Mixture A: | |
| Water | 33.4 parts |
| High amylose (70%) corn starch | 18.8 parts |
| Ammonium Sulfate | 9.4 parts |
| Mixture B: | |
| Water | 15.4 parts |
| Purity Gum BE (a cold water soluble 80 water fluidity amioca dextrin treated with 3% octenyl succinic anhydride available from National Starch and Chemical Corp.) | 7.8 parts |
| PPF NJ 1838 Fragrance Oil | 15.4 parts |

Mixture A was made with simple low speed blending. Mixture B was made by adding the components, in the order listed, to a beaker with continuous high shear agitation (Dispersator, Premier Mill Corp.) to form a 5-10 micron emulsion of the oil. Part B was then added to part A with gentle agitation.

The suspension of raw starch and CWS starch/oil droplets in salt solution produced by combining parts A and B was jet cooked at 150° C., vented to atmospheric pressure and degassed, and applied to a chilled drum as described above.

The resulting product was a firm flexible sheet. All the water present in the degassed cook was contained in the sheet; there was no free liquid. The wet sheet had a strong odor characteristic of the fragrance oil. Microscopic examination showed the oil to be present as droplets 1 micron diameter or less trapped in the starch matrix.

The sheet was readily cut into ¼ inch flakes. They were dried in a Dietert Moisture Teller at 38° C. to approximately 20% moisture. These flakes had a persistent odor characteristic of the fragrance oil. The flakes were free-flowing and non sticky.

After the flakes had come to equlibrium room temperature moisture (about 12%) they were analyzed for volatiles using a Dupont Instruments Model 951 Thermo-Gravimetric Analyser. Analysis showed that approximately 60% of the oil in the original slurry was retained in the dried flakes.

EXAMPLE 6

Encapsulation of Dimethylanthranilate

High amylose starch (Hylon VII, National Starch and Chemical) was slurried in water at 35 percent anhydrous solids. Sodium stearyl lactylate was added to a concentration of 0.1 percent on total weight.

This slurry was processed through the jet cooking and drum casting equipment previously described. Temperatures in the jet cooking stage were 175°-180° C. Flash chamber temperatures were maintained at 120°-125° C. Dimethylanthranilate (DMA) was metered into the hot starch cook after the flash chamber at a rate chosen to give 30 percent DMA on anhydrous starch and DMA weight. The DMA/starch mix was emulsified in-line using a turbine pump. Exit temperature after emulsification was 85°-92° C.

The starch DMA emulsion was spread by an applicator blade onto the surface of a chilled drum in an approximately ⅛th inch coating. It rapidly set to a firm opaque white sheet. The cool sheet was removed from the drum by a doctor blade and cut to approximately ¼ inch cubes with a Comitrol cutter (Ureschel Laboratories). These cubes were dried in a Uni-Glatt fluid bed dried (Glatt Air Techniques).

Composition of the dried was shown by analysis to be:

| Starch | 62.3% | (on total matter) |
|---|---|---|
| DMA | 24.7% | (28.4% on dry matter) |
| Water | 13.0% | |

94 percent of the added DMA was retained in the dried sheet.

When 10 grams of the encapsulated DMA were stored in 100 ml of distilled water for 7 days, only 9% of the encapsulated material was lost.

EXAMPLE 7

Encapsulation of Aspartame

High amylose starch (Hylon VII National Starch and Chemical) was slurried in water at 30% anhydrous solids.

The slurry was jet cooked at 150° C. A portion of the hot cooked starch was placed in a Waring Blendor and Aspartame (The Nutrasweet Co., Skokie, Ill.) added at a level of 15% on starch. After 30 seconds mixing the aspartame was thoroughly mixed into the starch. It was then spread as a thin layer in chilled metal pans to simulate drum casting and rapidly set into a firm sheet. The cooked sheet was diced and dried in a Dietert dryer at 68° C. for 45 minutes. The dryer encapsulated aspartame was ground to less than 200 mesh using a Moulinex coffee mill.

Lab scale batches of chewing gum were made incorporating the 200 mesh encapsulated aspartame at 0.15% aspartame on total and a control using unencapsulated aspartame. An eight member taste test panel found in blind testing that the gum containing the encapsulated aspartame produced a sweet taste from one to 15 minutes longer than the control.

Now that the prefered embodiments of the present invention have been described in detail, various modifications and improvements thereof will become readily apparent to those skilled in the art. Accordingly the spirit and scope of the invention are to be limited only by the appended claims and not by the foregoing specifications.

We claim:

1. A process for encapsulation of materials in a starch matrix comprising the steps of:
   (1) slurrying the starch in water;
   (2) thoroughly dispersing the starch in the slurry by injecting steam at a pressure of at least 110 psi into the slurry to raise its temperature to 120° to 180° C. at a pressure of 55–120 psi or above;
   (3) adding to the dispersion the material to be encapsulated and effecting intimate mixing of the latter therein;
   (4) spreading the resultant mixture on a chilled surface;
   (5) recovering the encapsulated material in sheet form; and
   (6) cutting or grinding and drying the resultant matrix of starch and encapsulated material.

2. The process of claim 1 wherein the material to be encapsulated is selected from the group consisting of the flavors; seasonings; natural and artificial sweeteners; pigments; metallic powders; latices; oils; plasticizers; herbicides; insecticides; fungicides; nematicides; bacteriocides; rodenticides; molluscicides; acaricides; larvacides; fumigants; animal repellants; insect repellants; plant growth regulators; fertilizers; pheromones; odor producing compositions; catalysts; adhesives; pressure sensitive color formers; electrostatographic toners; pressure rupturable lubricants; antifoulants; phase change materials; fire extinguishers; corrosion inhibitors; defoamers; sizing agents; thickeners; sub-cutaneous medications; unsaturated fats and acidulants.

3. The process of claim 1 wherein up to 50% of the starch is replaced by a water soluble hydrocolloid.

4. The process of claim 3 wherein the water soluble hydrocolloid is selected from the group consisting of polyvinyl alcohol, carboxymethylcellulose, hydroxyethylcellulose, polyacrylic acid and polyvinyl pyrrolididdone.

5. The process of claim 1 wherein the starch employed contains more than 50% amylose.

6. The process of claim 1 wherein a salt selected from the group consisting of ammonium sulfate, ammonium monobasic or dibasic phosphate, magnesium sulfate, sodium sulfate and mixtures thereof is additionally present in the starch slurry.

7. The process of claim 6 wherein the salt is present in an amount of 10 to 20% by weight of the slurry solids.

8. The process of claim 6 wherein the starch contains less than 50% amylose.

9. The process of claim 6 wherein the salt if ammonium sulfate or ammonium phosphate and the pH of the slurry is adjusted to a pH of 8 or below.

10. The process of claim 6 wherein the salt is magnesium sulfate.

11. The process of claim 1 wherein the pressurized starch dispersion resulting from step (2) is piped to a vertical flash chamber to separate the gas components and degas the liquid starch.

12. The process of claim 1 wherein the chilled surface is a revolving drum.

13. The process of claim 1 wherein the chilled surface is a continuous belt.

14. A process for the encapsulation of dimethyl anthranilate in a starch matrix comprising the steps of:
   (1) slurrying the starch in water;
   (2) thoroughly dispersing the starch in the slurry by injecting steam at a pressure of at least 110 psi into the slurry to raise its temperature to 120° to 180° C. at a pressure of 55–120 psi or above;
   (3) adding dimethyl anthranilate to the dispersion and effecting intimate mixing of the latter therein;
   (4) spreading the resultant mixture on a chilled surface;
   (5) recovering the encapsulated material in sheet form; and
   (6) cutting or grinding and drying the resultant matrix of starch and encapsulated material.

15. A process for the encapsulation of aspartame in a starch matrix comprising the steps of:
   (1) slurrying the starch in water;
   (2) thoroughly dispersing the starch in the slurry by injecting steam at a pressure of at least 110 psi into the slurry to raise its temperature to 120° to 180° C. at a pressure of 55–120 psi or above;

(3) adding aspartame to the dispersion and effecting intimate mixing of the latter therein;

(4) spreading the resultant mixture on a chilled surface;

(5) recovering the encapsulated material in sheet form; and (6) cutting or grinding and drying the resultant matrix of starch and encapsulated material.

16. The process of claim 14 wherein a salt selected from the group consisting of ammonium sulfate, ammonium monobasic or dibasic phosphate, magnesium sulfate, sodium sulfate and mixtures thereof is additionally present in the starch slurry.

17. The process of claim 16 wherein the salt is present in an amount of 10 to 20% by weight of the slurry solids.

18. The process of claim 15 wherein a salt selected from the group consisting of ammonium sulfate, ammonium monobasic or dibasic phosphate, magnesium sulfate, sodium sulfate and mixtures thereof is additionally present in the starch slurry.

19. The process of claim 18 wherein the salt is present in an amount of 10 to 20% by weight of the slurry solids.

* * * * *